United States Patent [19]

Schenk et al.

[11] 4,324,296
[45] Apr. 13, 1982

[54] MULTI-SECTION AGRICULTURAL IMPLEMENT INCLUDING LATCH ASSEMBLY THEREFOR

[75] Inventors: Dale C. Schenk, Hamilton; Anton H. G. Van Hooydonk, St. Catharines, both of Canada

[73] Assignee: International Harvester Company, Chicago, Ill.

[21] Appl. No.: 228,046

[22] Filed: Jan. 26, 1981

[51] Int. Cl.³ .............................................. A01B 73/00
[52] U.S. Cl. ..................................... 172/311; 172/466
[58] Field of Search ............... 172/311, 446, 456, 466, 172/662, 776

[56] References Cited

U.S. PATENT DOCUMENTS

| | | | |
|---|---|---|---|
| 3,207,342 | 9/1965 | Trojan | 172/456 UX |
| 3,874,459 | 4/1975 | Herberholz | 172/311 |
| 3,967,684 | 7/1976 | Haverdink | 172/311 |
| 4,042,044 | 8/1977 | Honnold | 172/311 |
| 4,204,575 | 5/1980 | Richardson et al. | 172/311 X |

OTHER PUBLICATIONS

"Glencoe Field Cultivators for High Powered Farming", Glencoe, Bloomington, Illinois, 61701, Sep. 2, 1977.

*Primary Examiner*—Richard T. Stouffer

*Attorney, Agent, or Firm*—J. J. Getchius; F. D. Au Buchon

[57] ABSTRACT

A mechanism for folding the wings of a multi-section implement from a transversely extending working position to a latched, vertical transport position relative to the main section and return. The mechanism includes a hydraulic cylinder that extends between the main section and each wing and a support and latch assembly. This assembly includes a fixed support on the main section and a telescoping tube for each wing which has its outer end pivotally connected to the wing and its inner end pivotally attached to the support. A latch structure is attached to the inner end of each tube and includes a crank arm pivotally mounted on the latch structure and pivotally connected to the rod of a single cylinder. A lever extends from this connection to a slidable mount on a slotted hole in the fixed support. The latch structure has a spring loaded tongue that engages a ramp having an aperture therefor on the outer end of each tube to latch the inner and outer ends of each of the tubes together. The latch and wing cylinder are connected in parallel and the wing cylinders then move the wings to the working position after unlatching. To move the wings to the transport position requires contrary movement of the single cylinder to first release the tongues which are then biased into position to engage the ramps and apertures to latch, as the wing cylinders raise the wings. The latches also support the wings, via the tubes, in the transport position.

5 Claims, 7 Drawing Figures

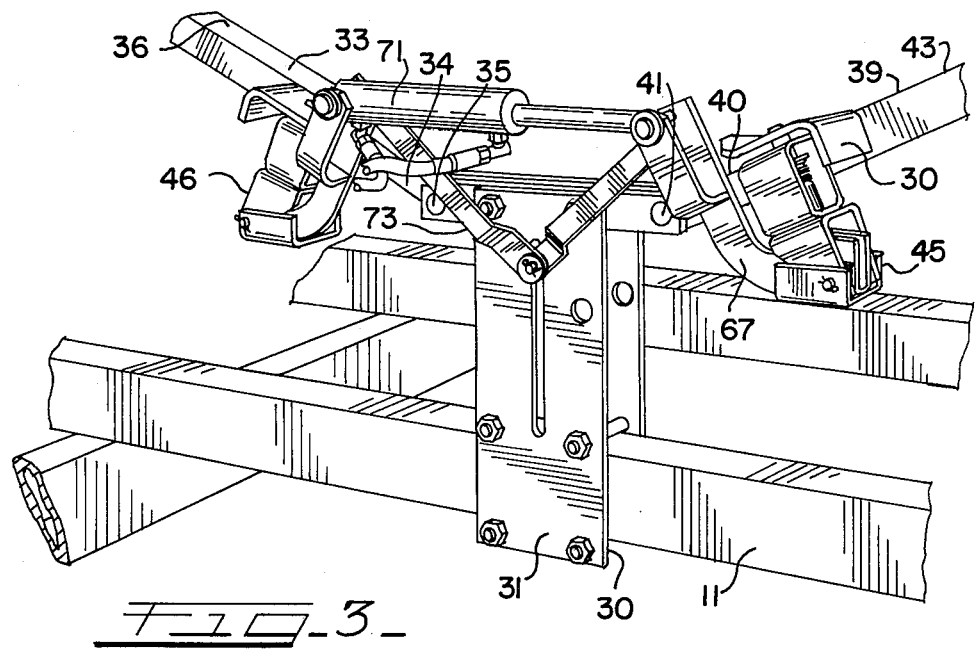
FIG_3_
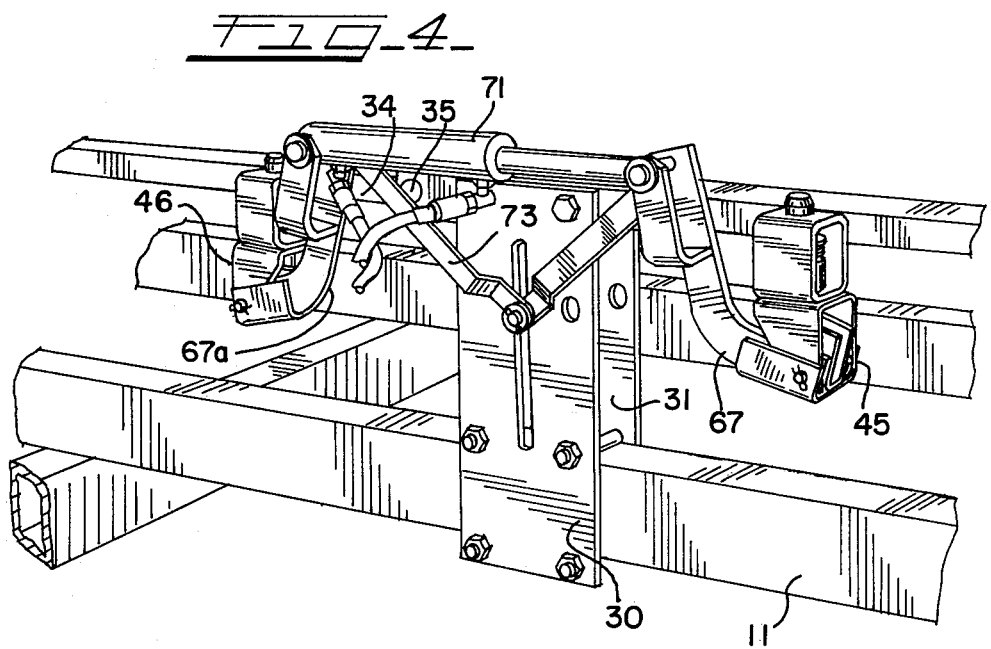
FIG_4_

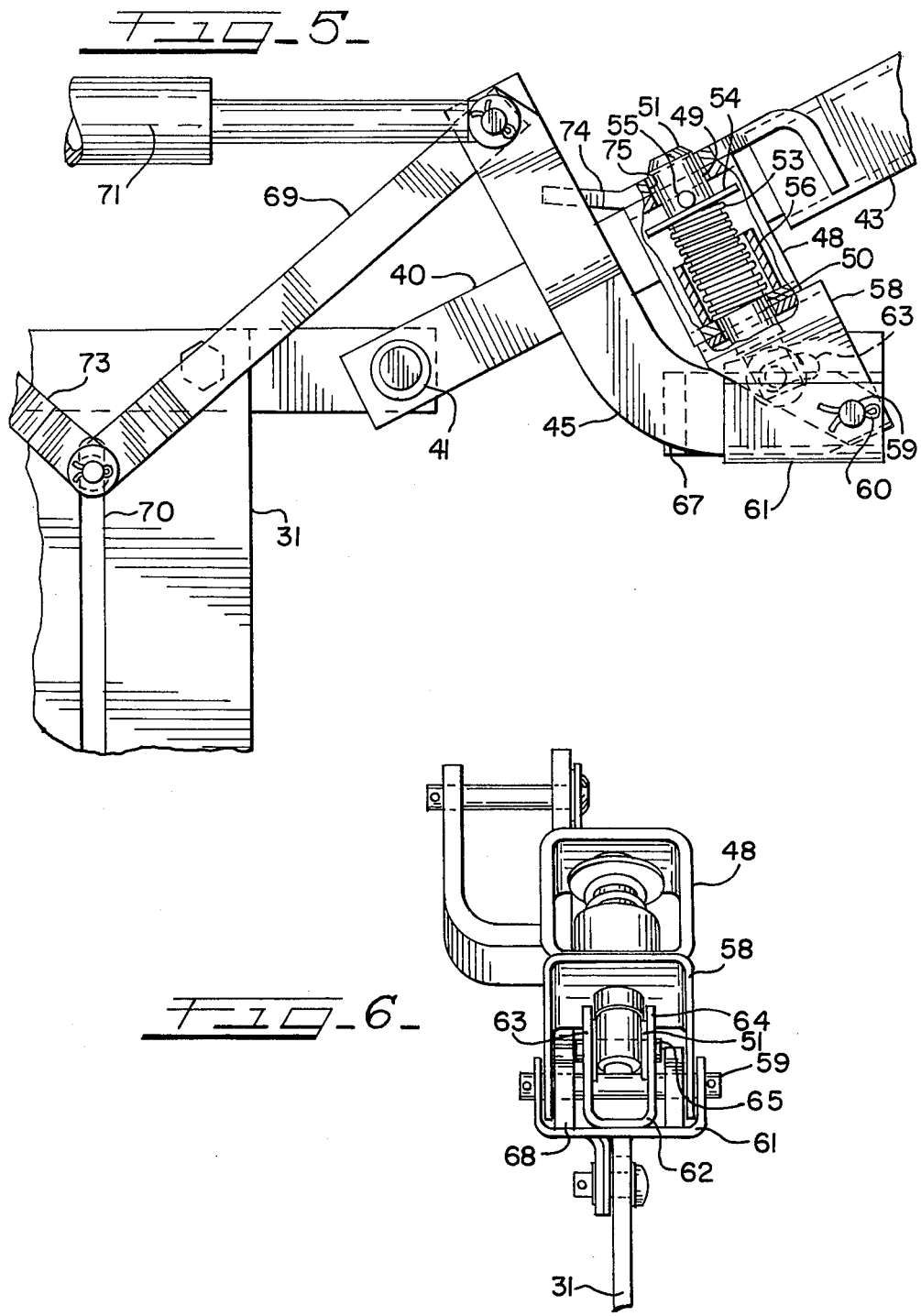

MULTI-SECTION AGRICULTURAL IMPLEMENT INCLUDING LATCH ASSEMBLY THEREFOR

BACKGROUND OF THE INVENTION

1. Field of the Invention

This invention pertains generally to implements foldable between work and transport positions.

2. Description of the Prior Art

Particularly in rather transversely lengthy cultivators or other light tillage implements that are used to work large spans of soil, folding of the various implement sections either vertically, forwardly, or rearwardly is required for transport over narrow roads. Normally this is done hydraulically, but the Operator usually has to dismount and insert pins in suitable apertures to maintain the folded implement in a safe transport condition. He has to reverse this procedure when preparing the implement for work. This takes undue time.

SUMMARY OF THE INVENTION

Applicants, as a consequence, have designed a folding mechanism that dispenses with the pins or manually operated spring loaded latches and can be operated to accomplish the folding or unfolding procedure from the tractor seat. Specifically, Applicants utilize a double acting hydraulic cylinder to upwardly fold each wing section approximately 90° to the main section. Preferably, via a slotted hole bracket in each wing section that connects to the cylinder rod, the wing section can float over uneven ground without pumping the cylinder when in the lowered working position. To support each wing in the noted 90° position relative to the main section in transport, Applicants utilize a telescoping tube arrangement. The outer end of the tube is pivotally connected to the wing forward of the wing cylinders and the inner tube is pivotally connected to a central bracket support on the main section. To maintain the wings in the noted transport position, which is over center of the wing pivots the tubes of each wing are latched together to prevent unfolding. Further, the latched tubes support the weight of each wing. A single cylinder positioned between a pair of cranks connected to latch levers slidably connected to the support, actuate the cranks, preferably when retracted, to simultaneously move a spring loaded tongue of a latch mounted on the inner tube of each pair to withdraw each tongue from an apertured ramp on the outer tube. The cylinder, since small and having light loads when connected in a parallel hydraulic circuit with the wing cylinders, acts first to release the latch tongues, the wing cylinders then extend to lower the wings to the working position with the support tubes also moving apart and downward. To move to the transport position a contrary procedure is followed. The latch cylinder is first extended which moves the cranks away from the spring loaded tongues wherein each spring sets the tongue for latching. In sequence, the wing cylinders then upwardly fold the wings and the tubes telescope until a ramp on the wing tube having an aperture encounters each tongue and latches. As mentioned, the wings are supported on the latched tubes. The implement is then ready for transport. Although only two of the wings are shown, clearly additional 180° folding outer wings could be attached to each wing with subject design for a double fold implement having a greater working area. By the use of structure providing varied load requirements the proper folding sequence of outer and then inner wings can be achieved. Subject design in an economical straight-forward fashion conveniently and safely provides the folding function with a minimum of Operator effort.

It is, therefore, an object of this invention to provide a new and improved folding mechanism for an implement.

Another object of this invention is to provide a mechanism that folds and latches the wing sections to the main section of the implement and vice versa that is operable from the tractor seat.

Another object of this invention is a mechanism that supports the wing sections on the main section in the folded or transport position.

BRIEF DESCRIPTION OF THE DRAWINGS

FIG. 3 is a front view showing the support and latch assembly of the mechanism in the transport position;

FIG. 4 is a front view showing the support and latch assembly of the mechanism with the cylinder extended and latch tongues ready for engagement with the tube ramps as the wings raise;

FIG. 5 is an enlarged front view (partially cut-away) of the latch portion of the left wing in the latched position;

FIG. 6 is a side view of the structure of FIG. 5 with tube 39 removed; and

FIG. 7 is a hydraulic diagram for the folding mechanism.

DESCRIPTION OF THE PREFERRED EMBODIMENT

Figure 1:
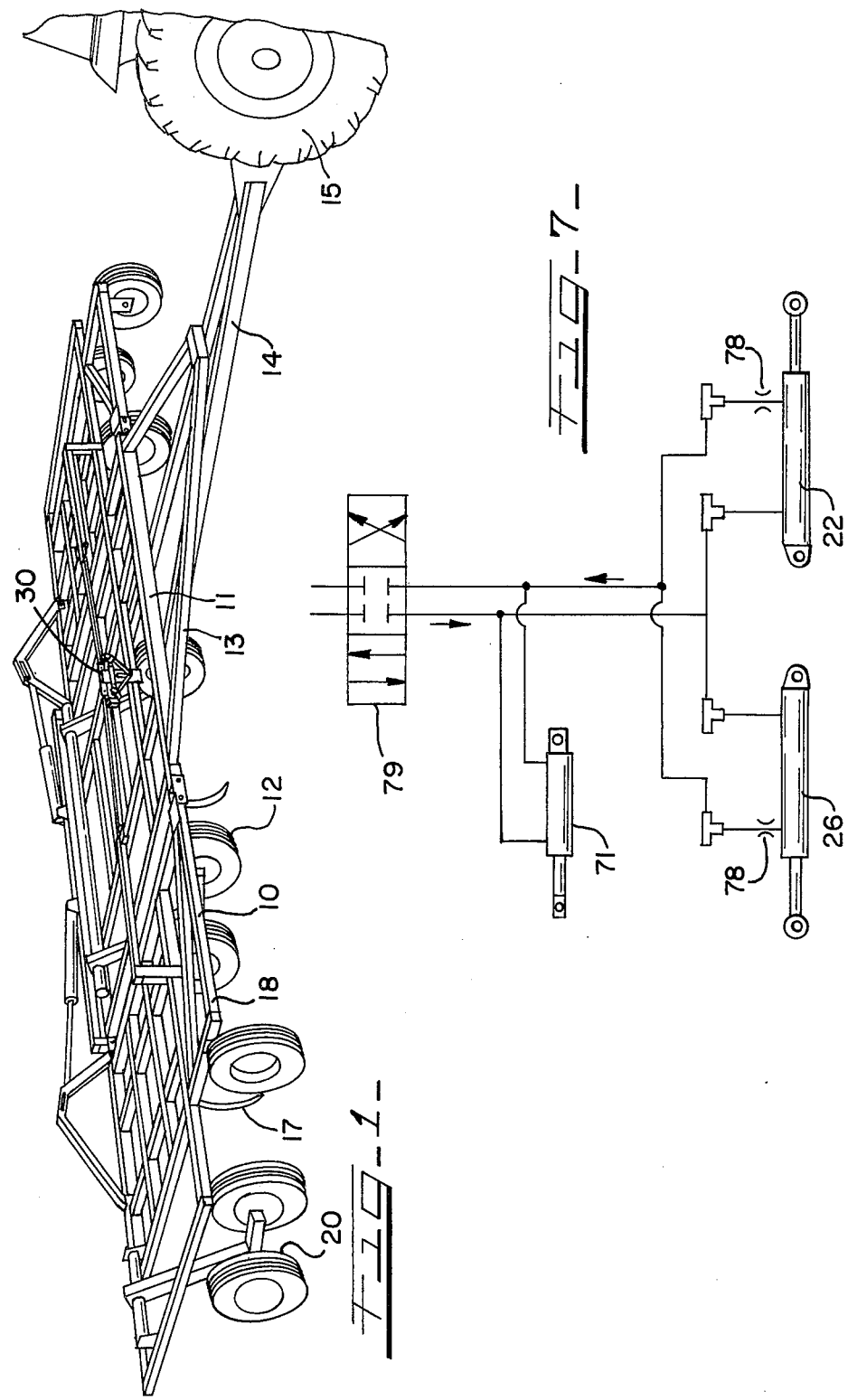
FIG. 1 is a front perspective view of the implement in the working position.
Figure 2:
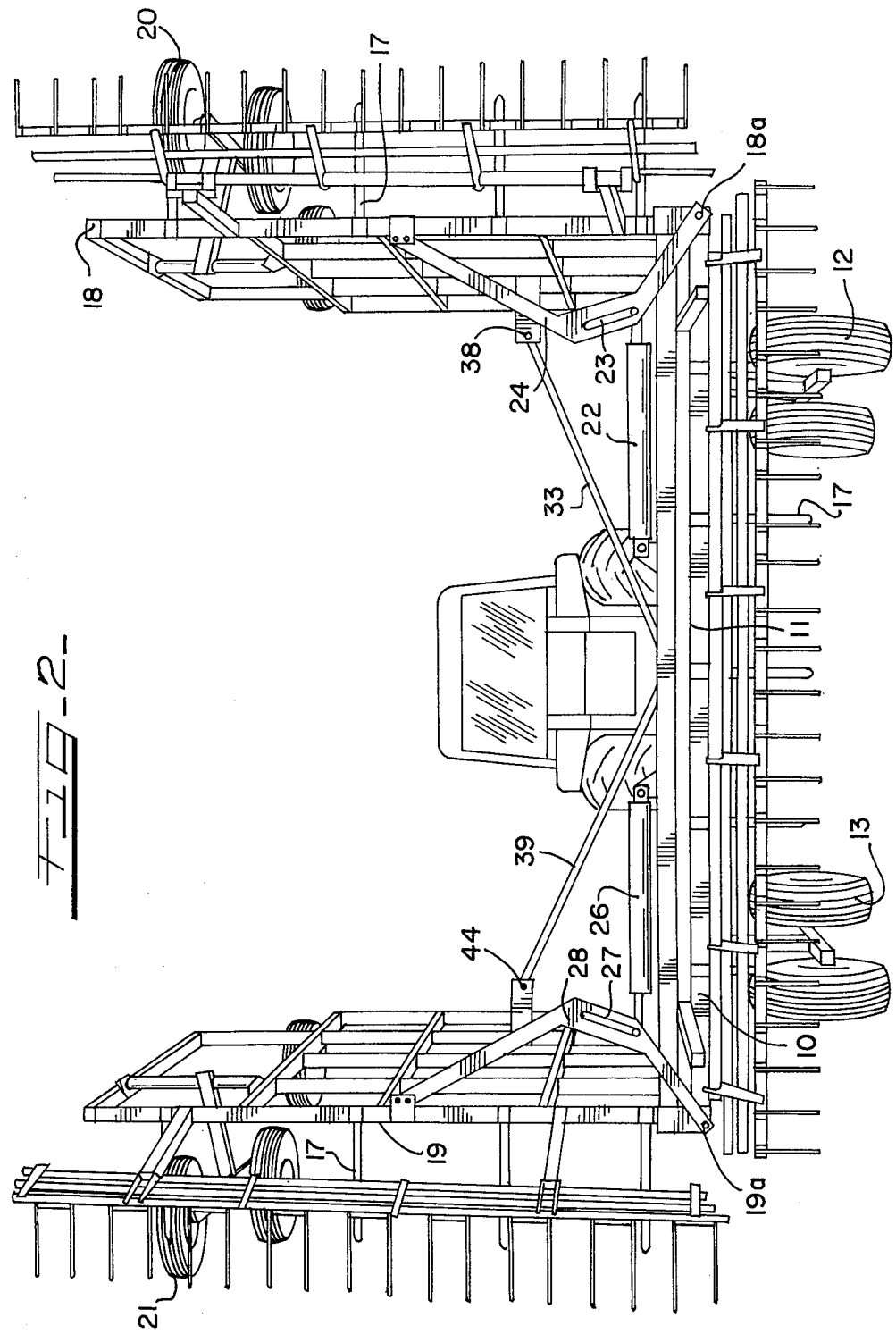
FIG. 2 is a rear view of the implement showing same in the folded or transport position.

Referring to the FIGS. 1 and 2, 10 indicates a multi-section implement which in this case is a field cultivator. Cultivator 10 has an elongated transverse center section 11 located on two pairs of laterally offset bogie type ground wheels 12 and 13. Center section 11 has a long forwardly extending draft tongue 14 for connection to a prime mover 15 by any suitable means. Also mounted on center section 11 are laterally spaced downwardly depending preferably spring loaded tooth cultivator shanks 17.

Pivotally mounted via suitable hinges to each end of the center section 11 (when standing to the rear of the implement and looking toward the tractor) is right wing section 18 on pivot axis 18a having a pair of bogie type ground wheels 20 and tools 17 and left wing section 19 or pivot axis 19a having bogie wheels 21 and tools 17. Double acting hydraulic cylinder 22 is pivotally connected to the rear of center section 11 at the base end and pivotally connected to the right wing section 18 at the rod end via upwardly extending slotted hole 23 (see FIG. 2) in wing structure 24. Similar cylinder 26 is pivotally connected to center section 11 at the base end and pivotally connected to left wing section 19 at the rod end via slotted hole 27 in similar wing structure 28. In the working position of the implement shown in FIG. 1, the cylinders are extended and each wing, due to the slot orientation, can float over ground irregularities via the pivot axes without affecting the cylinders. In the folded or transport position of approximately 90° shown in FIG. 2 the rod end remains at the end of the slot. Since this position is not exceeded, there is no free fall of the wing where the center of gravity passes over the pivot to the transport position. Shown only in FIG. 2, is a typical mulcher attachment mounted on the rear of the implement and which may be used with same.

Located at the front end of center section 11 is latch and support means 30. This structure is shown best in FIGS. 1, 3, 4, 5 and 6. Means 30 includes support bracket 31 rigidly and centrally mounted on section 11. Right telescoping tube assembly 33 includes inner tube 34 pivotally mounted on bracket 31 at pivot 35. Outer tube 36 of this assembly 33 is pivotally mounted on wing 18 at pivot 38. Left tube telescoping assembly 39 is similar to tube assembly 33. Assembly 39 includes inner tube 40 pivotally mounted on bracket 31 at pivot 41. Outer tube 43 of assembly 39 is pivotally connected to wing 19 at pivot 44.

As shown best in FIGS. 5 and 6, the left hand latch portion 45 of means 30 is shown in detail. Right hand latch portion 46, not shown in the noted figures, is identical (see FIGS. 3 and 4)—except for hand. Thus, only latch portion 45 will be discussed in detail. Latch portion 45 has housing 48 which is essentially a piece of square tubing rigidly mounted on inner tube 40 of the assembly 39. Housing 48 has upper aperture 49 and lower aperture 50 for shaft or tongue 51 movable therethrough. Spring 53 extends between the lower wall of housing 48 and collar 54 surrounding shaft 51 and maintained thereon by pin 55 extending through the shaft 51. The spring biases the shaft 51 toward an extended position in regard to housing 48. Circular wall 56 rigid with the lower wall surrounds the shaft 51 and spring 53 and prevents crushing of the spring by collar 54. Also attached rigidly to the lower wall of housing 48 is clevis 58 which has an aperture aligned with aperture 50 for shaft 51. Pivotally mounted via pin 59 and cotter pins 60 is clevis 61 which is upwardly extending and encloses the open end of clevis 58. Clevis 61 also has an inner clevis 62 upwardly facing and rigid therewith. Clevis 62 has an arcuate slotted hole 63 and 64 in both clevis walls for pin 65 located therein and extending through the lower portion of shaft 51.

Also pivotally mounted on pin 59 is the crank 67 having bifurcated end 68 which straddles inner clevis 62. The crank upon counterclockwise movement on pin 59 in FIG. 5 moves clevis 61 and hence inner clevis 62 which via slotted holes 63 and 64 moves pin 65 and therefore shaft 51 downward against the action of spring 53. Contrary movement of the crank will allow the spring 53 to move shaft 51 upward. Pivotally attached to also bifurcated end of crank 67 remote from end 68 is lever 69. Lever 69 at the other end is pivotally and slidably attached to bracket 31 by vertical slotted hole 70. Also pivotally attached to crank 67 where it connects to lever 69 is the rod end of double acting cylinder 71. The base end of the cylinder is similarly pivotally attached to lever 73 of similar right latch portion 46 having crank 67a.

Completing the latch portion 45 is the curved ramp 74 of outer tube 43. Ramp 74 has aperture 75 for the projection therethrough of pin 51. Tube 43 does not have a stop to engage housing 48 to provide support for wing 19 in the transport position, but instead aperture 75 engages pin 51.

A feature of levers 69 and 73 is that they are equal in length, although opposite, and due to slot 70 ensure that the shafts of both latches 45 and 46 are released simultaneously upon the retraction of the cylinder 71 which activates both latches.

FIG. 7 is a schematic diagram of the hydraulic circuit. As shown, wing lift cylinders 22 and 26 are connected in parallel with cylinder 71 of means 30. Preferably cylinder 71 is connected at the rod end for retraction with the base end of cylinder 22 and 26 which extend when moving to the working position. A suitable restrictor 78 in the line from the rod end of the cylinder 22 and 26 slows the fall of the wings to the working position. A conventional 4-way closed center valve 79 in the circuit located at the driver's seat provides control of the circuit for movement of the wings between the working and transport positions.

In Operation, with the implement shown as in FIG. 1 in the operating position tools 17 work the soil as the implement is drawn by the tractor. With the wing cylinders extended, each wing can float over irregularities due to the slots 23 and 27 without affecting the cylinders. If it is desired to move the wings to the transport position after the tools are lifted from the soil, the valve is actuated from the tractor seat and fluid under pressure is directed to the rod ends of cylinders 22 and 26 to retract same. Also it is sent at the same time to base end of latch cylinder 71. Since this cylinder provides the least resistance, the cylinder is extended before the wing cylinders are retracted and crank 67 pivots clockwise about pin 59 thereby freeing spring 53 to move shaft 51 to an extended position ready for latching. Lever 73 and crank 67 are simultaneously activated to set latch portion 46. As the wing cylinders retract, the wings move upwardly and the tubes telescope inwardly with the ramp 74 contacting and depressing shaft 51 until same moves into aperture 75 to latch the tubes together. The implement is then in the transport position shown in FIG. 2 with the wings at the generally vertical position and over center of the pivot for easy and safe transport. The latch cylinder is preferably extended for latching and retracted for unlatching to prevent the cylinder from inadvertently extending to unlatch when in the transport position and hydraulic lines disconnected from the tractor due to the greater force available at the base end of the cylinder which could cause safety problems.

To move from the transport position, the operator actuates the valve to send fluid to the rod end of the latch cylinder and to the base end of the wing cylinders. Due to the light load on the latch cylinder, it retracts first before the wing cylinders operate, and draws lever 67 counterclockwise about pin 59. Bifurcated end 68 rotates clevis 61 and thus clevis 62 downwardly and holes 63 and 64 pull pin 65 and thus shaft 51 downwardly until same clears aperture 75, unlatching the latch. Latch portion 46 is simultaneously activated. The assemblies can now move apart and the wings lower, lowering the latches also mounted thereon. Suitable restrictors in the rod end lines of the wing cylinders slow the downward movement of the wings until the implement is again in the working position of FIG. 1.

What is claimed is:
1. A towable multisection agricultural implement and a folding mechanism thereof comprising:
(a) a horizontally disposed and transversely extending to the direction of travel main section having ground wheels and depending ground working tools;
(b) a wing section having ground wheels and depending ground working tools movably connected to each end of said main section and movable between an aligned ground working position and a generally vertical, folded transport position;

(c) a double acting hydraulic cylinder pivotally connected to the main section and to each said wing section to move each said wing section between the ground working and transport position;

(d) latch and support means for maintaining and supporting the wing sections in the transport position, said means comprising: a support mounted on said main section and a telescoping tube having one end pivotally mounted on each said wing section and the other end pivotally mounted on said support, a latch assembly mounted on each said other end of said tube adjacent the support and engageable with said one end of the tube to support same and having a spring biased latch member to latch same in the transport position, said latch member having a crank arm pivotally mounted thereon and a lever pivotally connected to said crank arm and slidably mounted on said support, a double acting hydraulic latch cylinder having a rod end pivotally connected to said crank arm and lever and said latch cylinder further having a base end pivotally connected to the crank arm and lever of the other opposing latch member, said latch cylinder and said wing cylinders being connected in parallel whereby said latch members are released by said crank arm before the wing cylinders move the wings to the working position and said latch members are reset before said wing cylinders move the wings to the folded and latched position.

2. The mechanism of claim 1 in which the levers and crank arms are of equal length and the levers are connected to said support by a generally vertical slot.

3. The mechanism of claim 2 in which said wing end of said tube has a curved ramp and an aperture therethrough for engaging the spring biased latch member of said latch assembly.

4. The mechanism of claim 3 in which said latch assembly has a clevis having separate walls with aligned generally arcuate slotted holes and said clevis is pivotally supported in said latch assembly and said latch member has a pin therethrough and located in said slots, said crank arm being adapted to move said clevis and thus said pin and said latch member against the spring to release the latch member.

5. The mechanism of claim 4 in which the latch cylinder is connected to retract the rod to unlatch the latch members and to extend the rod for the spring setting of the latch members.

* * * * *